(12) United States Patent
Bailey et al.

(10) Patent No.: US 10,832,477 B2
(45) Date of Patent: Nov. 10, 2020

(54) MODIFYING VIRTUAL REALITY BOUNDARIES BASED ON USAGE

(71) Applicant: INTERNATIONAL BUSINESS MACHINES CORPORATION, Armonk, NY (US)

(72) Inventors: Matthew Bailey, Basingstoke (GB); Andrew Daniel, Eastleigh (GB); Philip Jones, Hook (GB); Richard Pilot, Bishopstoke (GB)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/826,773

(22) Filed: Nov. 30, 2017

(65) Prior Publication Data
US 2019/0164343 A1 May 30, 2019

(51) Int. Cl.
| | |
|---|---|
| *G06T 19/00* | (2011.01) |
| *G06F 3/01* | (2006.01) |
| *G06T 19/20* | (2011.01) |
| *A63F 13/211* | (2014.01) |
| *A63F 13/25* | (2014.01) |

(Continued)

(52) U.S. Cl.
CPC .......... *G06T 19/003* (2013.01); *A63F 13/211* (2014.09); *A63F 13/25* (2014.09); *G06F 1/163* (2013.01); *G06F 3/011* (2013.01); *G06T 19/20* (2013.01); *G08B 21/02* (2013.01); *G06T 2219/2004* (2013.01); *G08G 9/02* (2013.01)

(58) Field of Classification Search
CPC .................. G06T 19/003; G06T 19/20; G06T 2219/2004; G08B 21/02; A63F 13/25; A63F 13/211; G06F 3/011; G08G 9/02
See application file for complete search history.

(56) References Cited

U.S. PATENT DOCUMENTS

| | | |
|---|---|---|
| 9,392,212 B1 | 7/2016 | Ross |
| 2007/0173265 A1 | 7/2007 | Gum |

(Continued)

FOREIGN PATENT DOCUMENTS

| | | |
|---|---|---|
| CN | 105999703 A | 10/2016 |
| GB | 2524269 A | 9/2015 |

OTHER PUBLICATIONS

YouTube, "Intel announces untethered VR with Project Alloy (CNET News)", published Aug. 16, 2016, 4 pages, https://www.youtube.com/watch?v=phUg9yijqPs.

(Continued)

*Primary Examiner* — William A Beutel
(74) *Attorney, Agent, or Firm* — Michael A. Petrocelli

(57) ABSTRACT

A method and system for modifying virtual reality (VR) boundaries based on usage includes defining, using a virtual reality system including a computer communicating with head set, a safe area defining a geographic location for a user. The safe area is monitored for when the user strays into a second area beyond the safe area. The second area is defined in relation to the safe area that the user strayed into beyond the safe area. The user interaction in the second area beyond the safe area for safety is assessed, and a determination is made when the second area is safe based on a criteria. In response to the determining that the second area is safe, not initiating an alert to the user of being outside the safe area.

19 Claims, 9 Drawing Sheets

(51) Int. Cl.
*G08B 21/02* (2006.01)
*G06F 1/16* (2006.01)
*G08G 9/02* (2006.01)

(56) References Cited

U.S. PATENT DOCUMENTS

| | | | |
|---|---|---|---|
| 2015/0265920 A1* | 9/2015 | Kim | A63F 13/49 463/31 |
| 2016/0124502 A1 | 5/2016 | Sawyer et al. | |
| 2016/0307425 A1* | 10/2016 | Jobin | G08B 21/02 |
| 2018/0190022 A1* | 7/2018 | Zamir | G06T 19/006 |
| 2018/0373412 A1* | 12/2018 | Reif | G06F 3/04815 |
| 2019/0043259 A1* | 2/2019 | Wang | G06F 3/04815 |

OTHER PUBLICATIONS

Salomoni et al., "Assessing the Efficacy of a Diegetic Game Interface with Oculus Rift", 2016 13th IEEE Annual Consumer Communications & Networking Conference (CCNC), 6 pages.
Mell et al., "The NIST Definition of Cloud Computing", Recommendations of the National Institute of Standards and Technology, Special Publication 800-145, Sep. 2011, 7 pages.

* cited by examiner

MODIFYING VIRTUAL REALITY BOUNDARIES BASED ON USAGE

BACKGROUND

The present disclosure relates to a method and system for modifying virtual reality (VR) boundaries based on usage.

Current VR systems provides users with ways, including images using a headset, for becoming immersed in a virtual world. In one example of a headset, the headset can completely obscure a user's vision, making them unable to perceive their environment including any hazards that may be in the area they are physically moving in. Systems that include such a headset may ask users to ensure that their space is completely free for movement/obstacle free. However, such a system requires the user to make an area obstacle free in a room. For example, the room can a cluttered environment.

Other solutions for VR systems may ask the user to sketch out in virtual space, the bounds or boundaries within the physical world/area that the user is allowed to operate in, thereby requiring a user to define an area that is safe. However, such system requirements require the user to define a physical area, and update and/or maintain the area as safe. Further, such a safe area is static regarding changes that can occur in an area, and as not assessing movement in the area by the user.

SUMMARY

The present disclosure recognizing the shortcoming of current VR systems and requiring a user defined area for safe play. The present disclosure recognizes that a safe area for VR use is not static in that the environment in the area can change and include objects that can be moved in and out of the area. Further, present systems may not account for a user movement in the area related to the physical space and objects in the area. A solution embodied in the embodiments of the present disclosure to monitor a play space or safe space for VR play to take into account users straying outside the defined safe space or incidents of collision within the safe space by the user.

A method, system, and computer program product for modifying virtual reality (VR) boundaries based on usage includes defining, using a virtual reality system including a computer communicating with head set, a safe area defining a geographic location complementary to a virtual reality environment for virtual reality interaction for a user. The safe area is monitored for when the user strays into a second area beyond the safe area. The second area is defined in relation to the safe area that the user strayed into beyond the safe area. The user interaction in the second area beyond the safe area for safety is assessed, and a determination is made when the second area is safe based on a criteria. In response to the determining that the second area is safe, not initiating an alert to the user of being outside the safe area.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Figure 1:
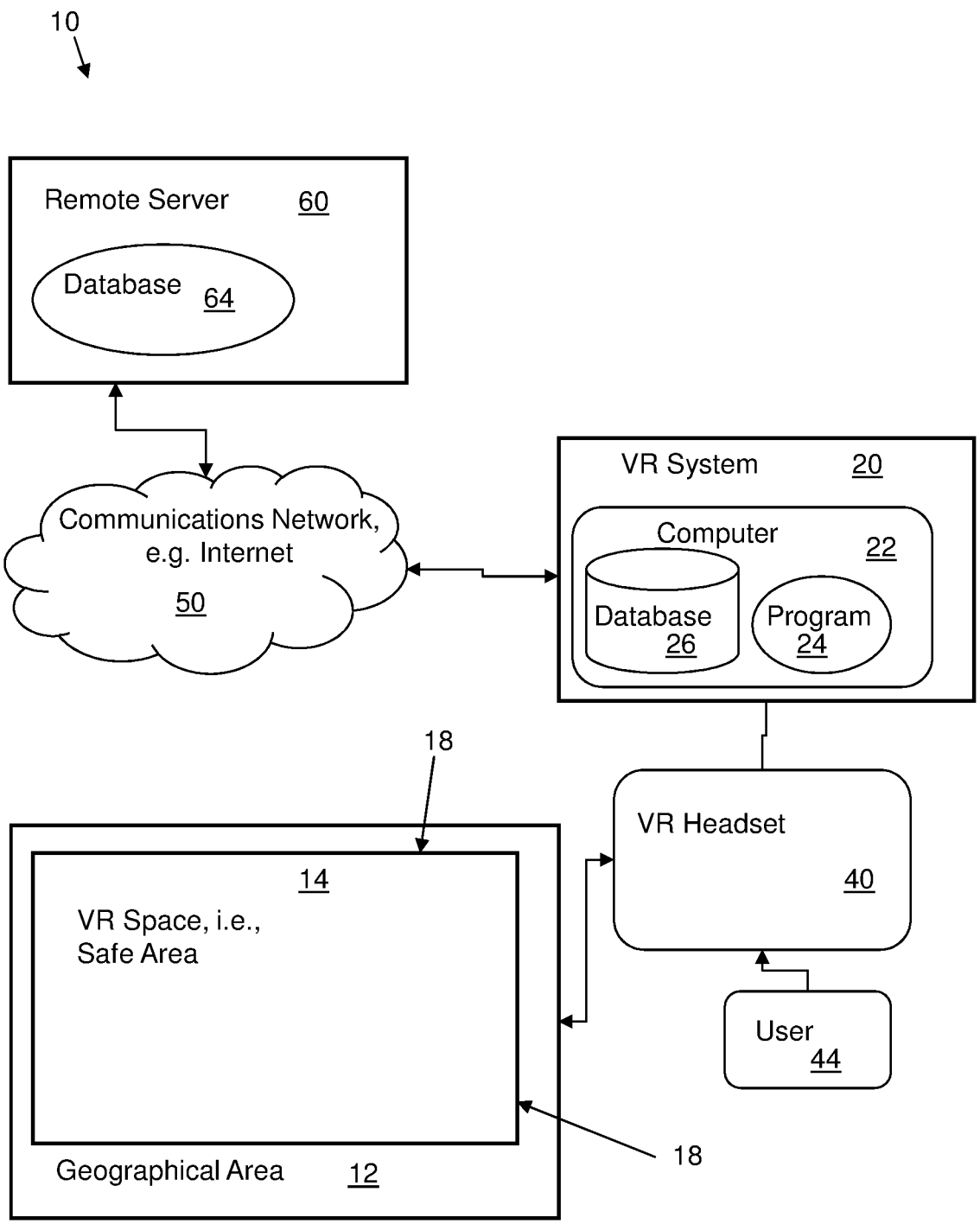
FIG. 1 is a schematic block diagram illustrating an overview of a system and methodology for modifying virtual reality (VR) boundaries based on usage, according to an embodiment of the disclosure.
Figure 2:
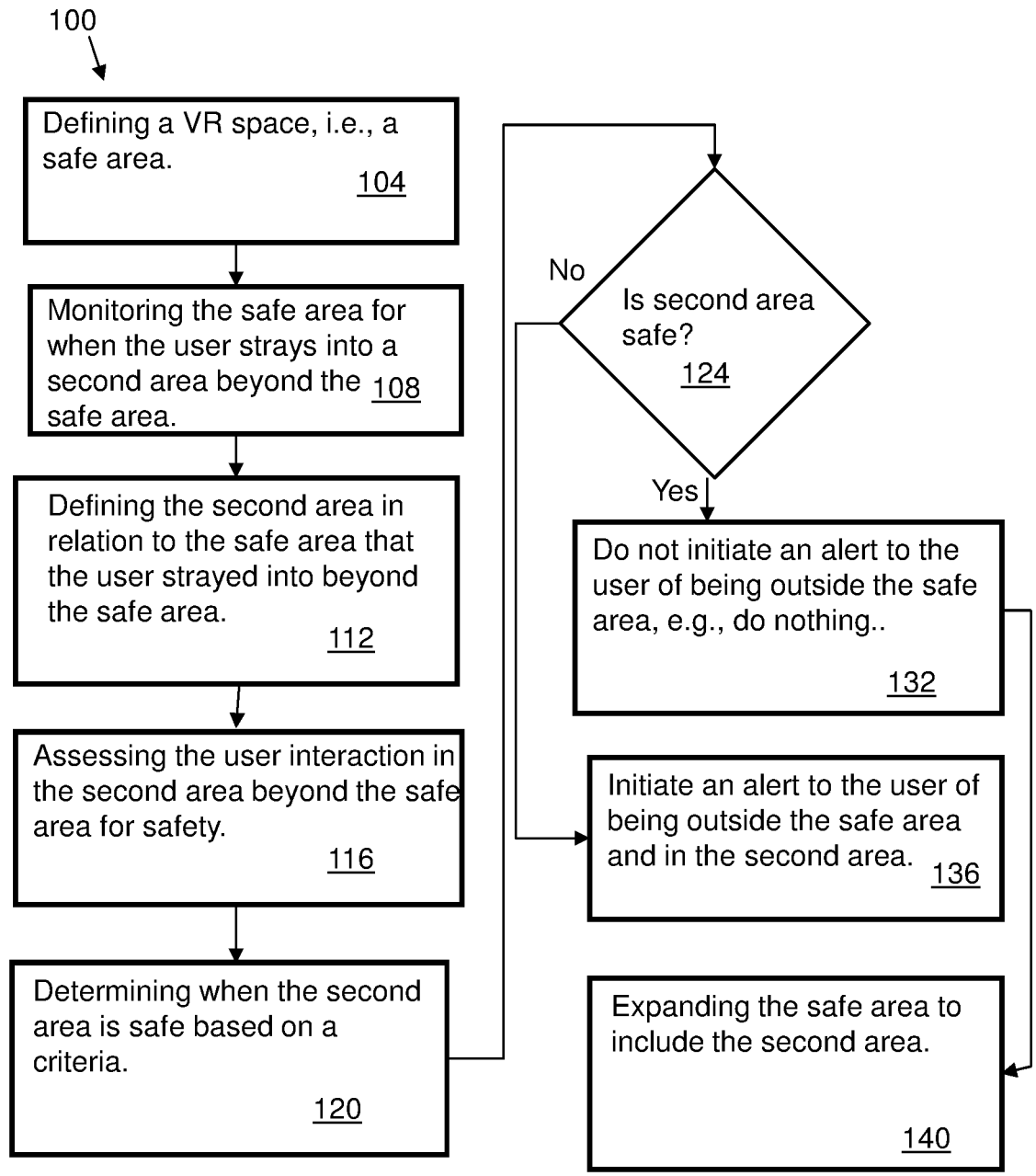
FIG. 2 is a flow chart illustrating a method, implemented using the system shown in FIG. 1, for modifying virtual reality (VR) boundaries based on usage, according to an embodiment of the disclosure.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Referring to FIGS. 1, 2, 3, and 4, a method 100 (FIG. 2) with reference to a system 10 (FIG. 1) according to an embodiment of the present disclosure is provided for modifying virtual reality (VR) boundaries based on usage by a user.

The method 100, can be embodied in a computer program. In general, the computer program 24 can be on a computer 22 which is part of a VR (Virtual Reality) system 20 communicating with a headset 40 used by a user 44. In general, after a boundary 18 is defined for a virtual environment, the VR boundary can be updated based on usage by the user 44. The computer 22 can include a database 26 for storing the boundaries of the geographical area and the virtual space based on the geographical area 12. In an alternative, the program can be part of a remote server 60 communicating with the headset or a local computer system, using a communication network 50, for example, the Internet. The remote server 60 may include a database 64 for storing data. In the presently described embodiment shown in FIG. 1, the method of the present disclosure is generically shown and described as part of a gaming VR system 20, having a computer 22, which communicates with other components of the system 10.

More specifically, the method 100 (referring to FIG. 2) includes defining, using a virtual reality system 20 including the computer 22 communicating with the headset 40, a VR space or safe area 14, as in block 104. The safe area 14 is complementary to a geographical area or location 12 for virtual reality interaction or play by the user 44. The safe area 14 is defined in response to user input, which for example, can include a demarcation of by the user of the safe area in the geographic area as part of the VR system setup.

Figure 4:
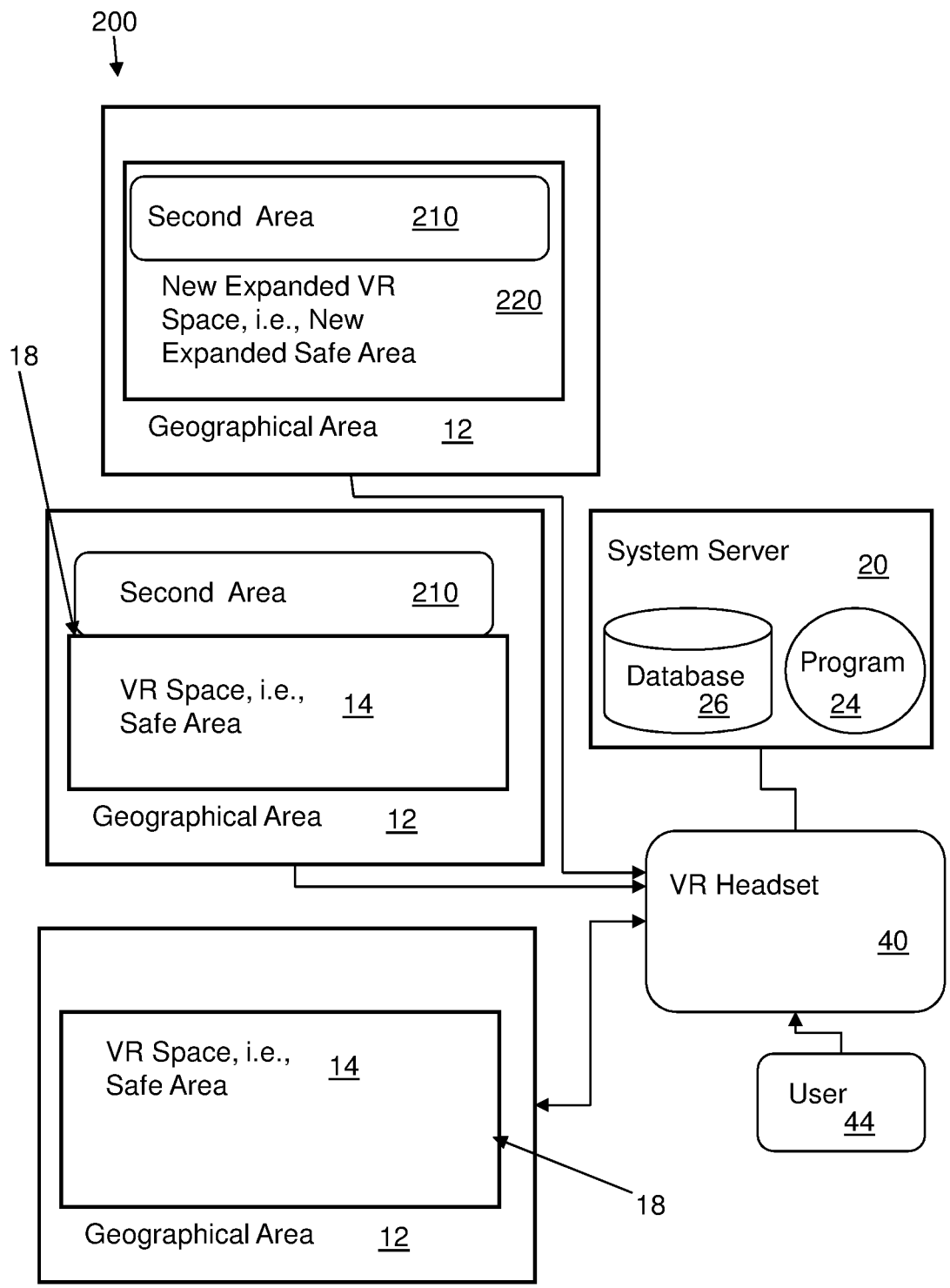
FIG. 4 is a functional block diagram depicting a system for modifying virtual reality (VR) boundaries based on usage according to the methods of FIGS. 2 and 3, and the system shown in FIG. 1, and according to an embodiment of the disclosure for determining and designating a second area as safe for VR interaction.
Figure 5:
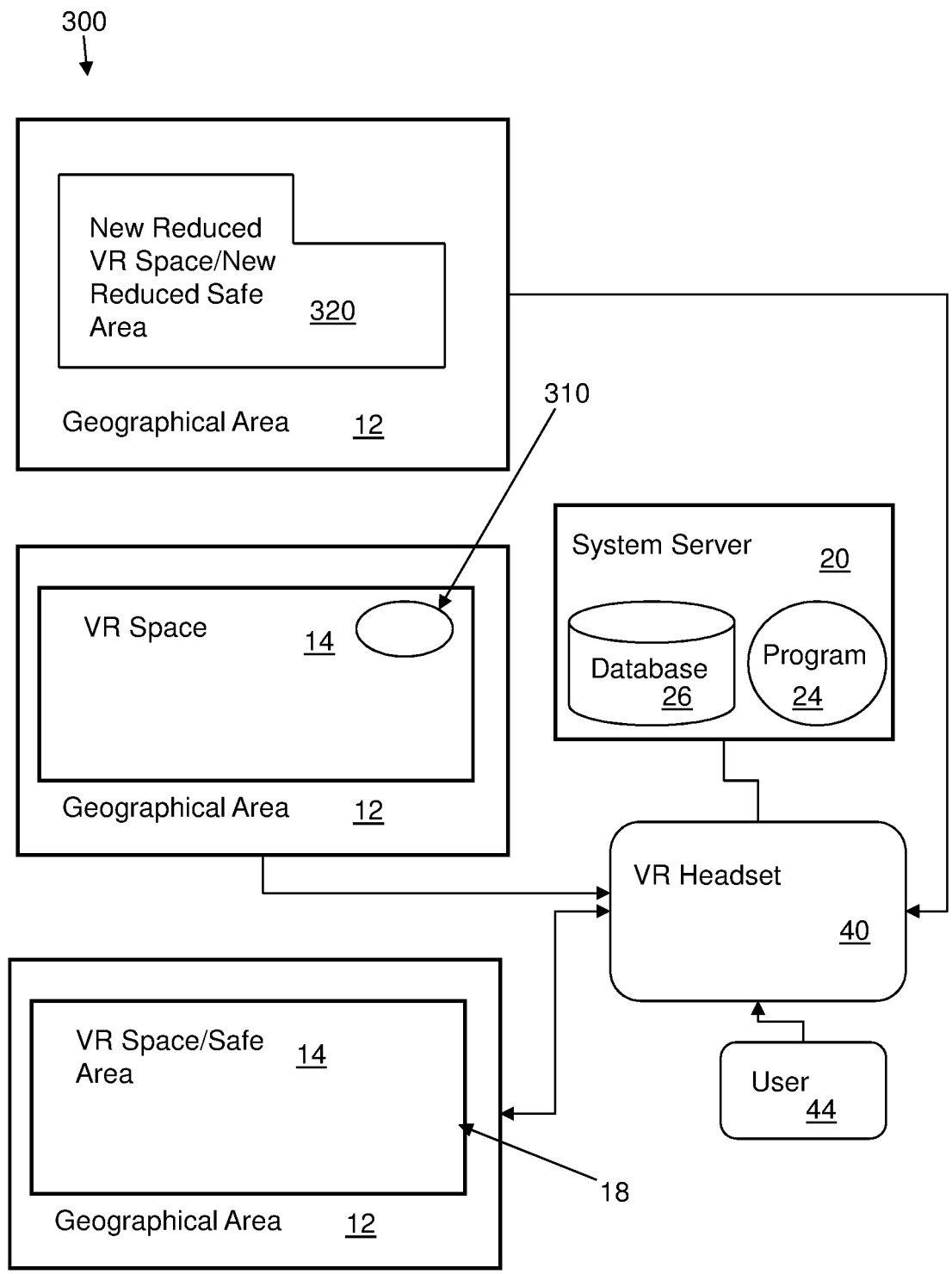
FIG. 5 is a functional block diagram depicting a system for modifying virtual reality (VR) boundaries based on usage according to the methods of FIGS. 2 and 3, and the system shown in FIG. 1, and according to an embodiment of the disclosure for determining and designating a sub-area as unsafe for VR interaction.

In describing the method 100 and system 10 of the present disclosure, reference is also made to a functional or operational schematic block diagram depicting a functional system 200 in FIG. 4 showing the second area 210 outside the safe space, and which elaborates on the system 10 shown in FIG. 1. Reference is also made to a functional or operational schematic block diagram depicting a functional system 300 in FIG. 5 showing a sub-area 310.

The method monitors the safe area 14 for when the user strays into a second area 210 (FIG. 4) beyond the safe area 14, as in block 108.

The second area 210 is defined in relation to the safe area 14, such that the user strayed beyond the safe area and into the second area, as in block 112. As shown in FIG. 4, the second area 210 is outside the safe area 14, but part of the geographical area 12. In one example, the geographical area can be a room or part a room, the room can be in a user's house or a room in a gaming facility. In this example, the second area is just outside the safe area, that is, beyond a boundary 18 of the safe area, as shown in FIG. 4.

The method includes assessing the user interaction in the second area beyond the safe area for safety, as in block 116. The assessing of the user interaction in the second area includes determining when the second area is safe based on a criteria, as in block 120. The criteria can include determining if an encounter or event occurs with an object or an item in the second area. An encounter or event can include a possible collision, or a near collision, or a collision with an object or another person. Each event can be weighted or given a numerical value. In one example, a threshold can be set for a number of collisions or near collisions to initiate designating an area as safe or unsafe.

Figure 6:
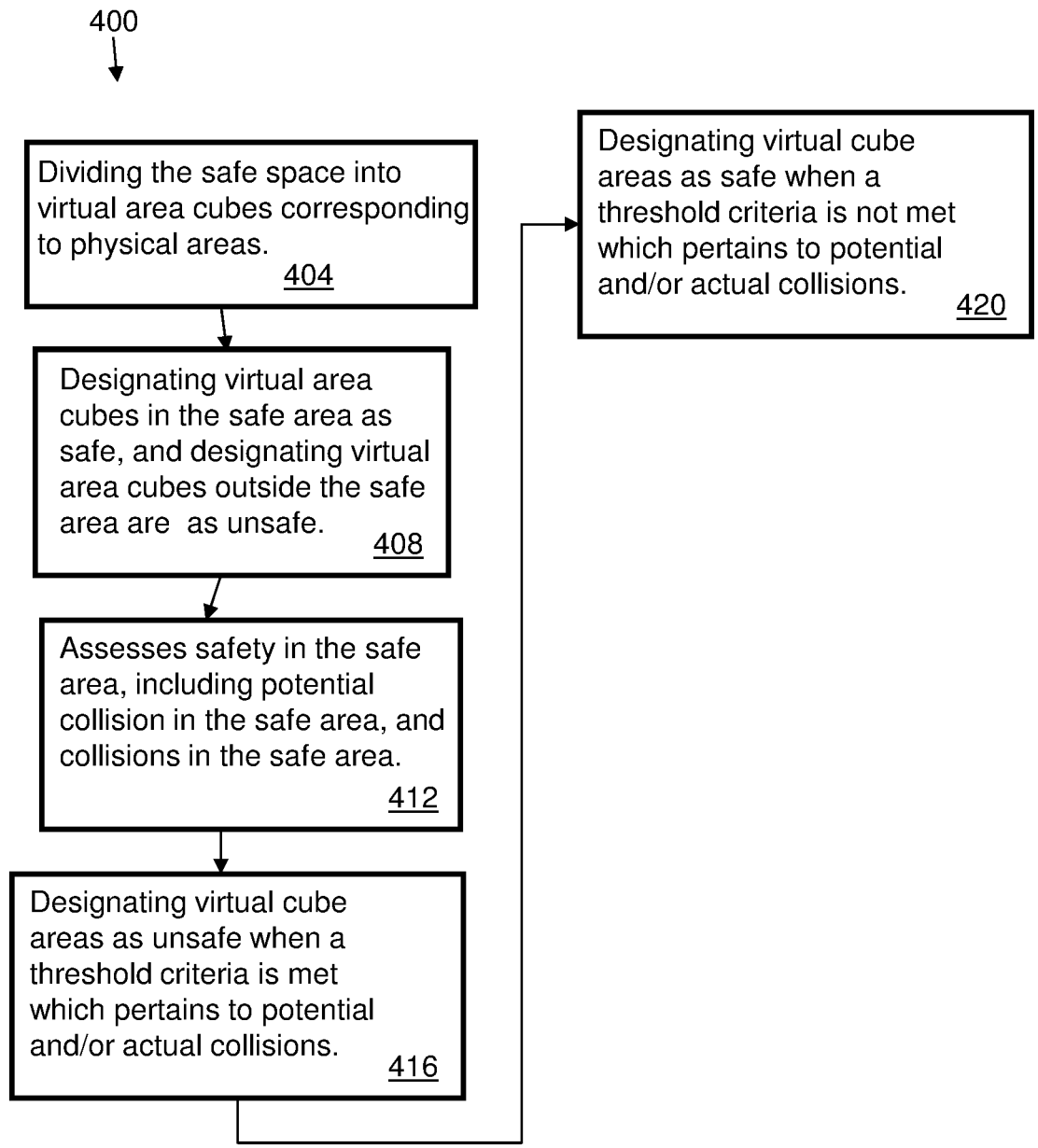
FIG. 6 is a flow chart of another method according to another embodiment of the disclosure for modifying virtual reality (VR) boundaries based on usage, and directed towards dividing virtual areas into cubes which correspond to physical spaces.

In one example (referring to FIG. 6), the method 100 can assess user interaction in the safe area and the second area according to the present disclosure using a process 400 of dividing the safe space of the virtual environment into virtual area cubes (three dimensional spaces or areas) corresponding to physical spaces or areas, as in block 404. Such a process can be used to define, that is geographically define, any area in the virtual space. For example, an area can be designated as having a length, a width, and a height. Virtual area cubes in the safe area are designated as safe, and virtual area cubes outside the safe area are designated as unsafe, as in block 408. As a user interacts in the safe area which corresponds with the physical area, the method assesses safety in the safe area, including potential collision in the safe area, and collisions in the safe area, as in block 412. The method can designate virtual cube areas as unsafe when a threshold criteria is met which pertains to potential and/or actual collisions, as in block 416. The method can designate virtual cube areas as safe when a threshold criteria is not met which pertains to potential and/or actual collisions, as in block 420.

Returning to FIG. 2, once a determination is made at block 124 based on blocks 116 and 120, when a threshold number of collisions or near collisions are detected, the method can designate the second area as unsafe, and initiate an alert to the user of being outside the safe area and in the second area, as in block 136. When a threshold number of collisions are not detected, the method can designate the second area as safe at block 132, and do nothing to alert the user of being outside the safe area and in the second area. The method includes expanding the safe area to include the second area as in block 140 after determining that the second area is safe. Alternatively, the method can mark or designate the second area as safe.

Figure 3:
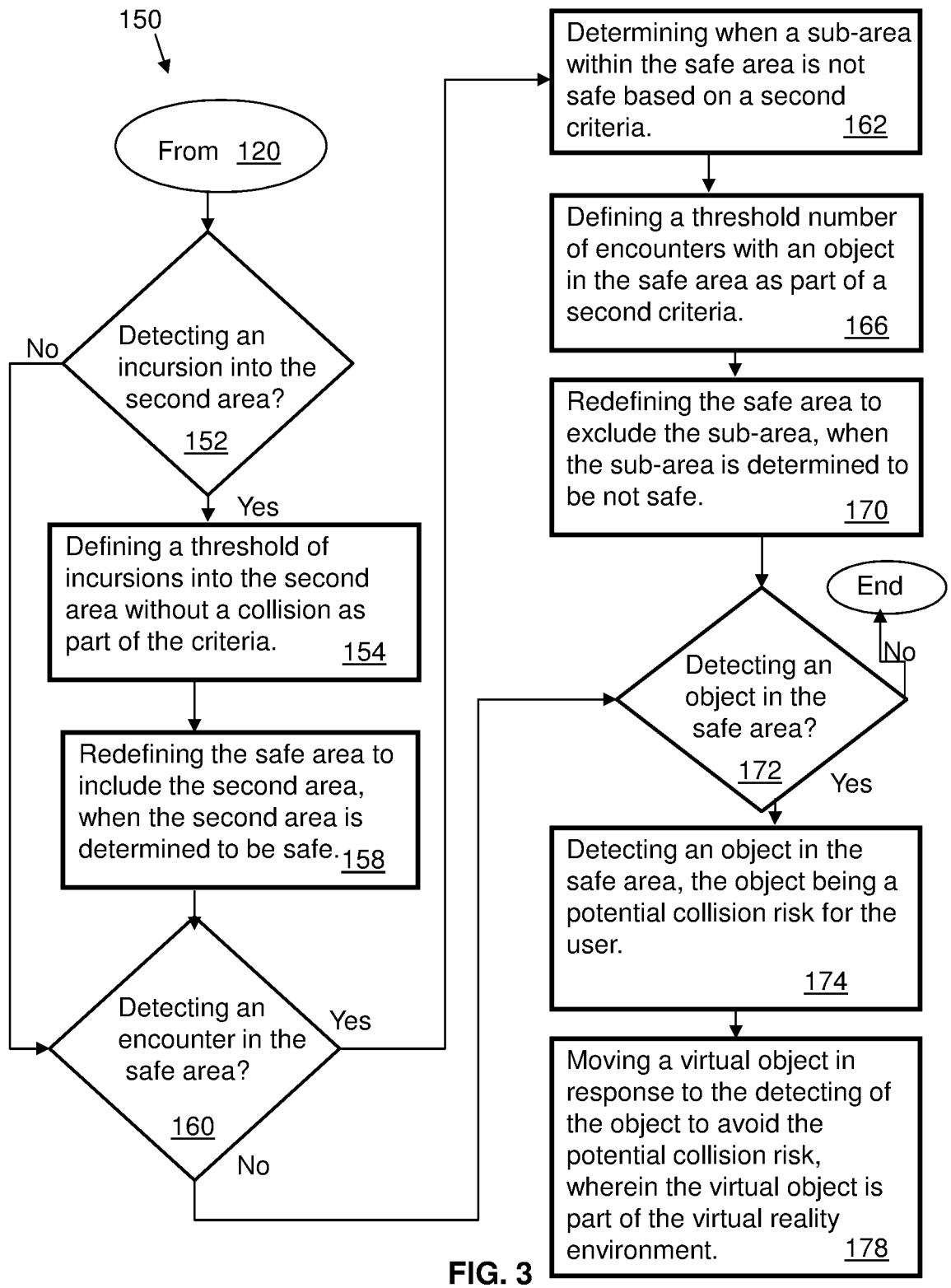
FIG. 3 is a flow chart illustrating another method continuing from the method from FIG. 2, for modifying virtual reality (VR) boundaries based on usage.

Referring to FIG. 3, embodiments of the present disclosure generally include re-defining the safe area, which includes reconfiguring the safe area by expanding the safe area to include a second area, and/or decreasing the safe area by extracting a sub-area of the safe area. A new expanded safe area or a new expanded VR space 220 can be created based on the re-defining. The new safe area has second dimensions of a physical areas different from a first dimensions of a physical area defining the safe area.

Referring to FIG. 3, a method 150 according to the present disclosure, continues from block 120 of the method 100 as an example of determining safe area modification based on criteria. The method 150 includes detecting an incursion into the second area at block 152. When an incursion is detected, the method defining a threshold of incursions into the second area without a collision as part of the criteria, as in block 154. When the second area is determined to be safe, the method redefines the safe area to include the second area, as in block 158.

When an incursion into the second area in not detected, the method proceeds to block 160. The method further includes determining or detecting (at block 160) when a sub-area within the safe area is not safe, based on a second criteria, as in block 162. As shown in FIG. 5, a sub-area 310 is depicted in the VR space (safe area) 14. The sub-area can be defined based on a potential collision or event of a user with an object or item, or detecting an object or item in the safe space, or from detecting an actual collision with an item or object by the user in the safe space. As discussed above with reference to FIG. 6, defining the virtual area can include dividing the area into virtual area cubes. Thus, in one example, the sub-area can be defined in terms of virtual cubes. The second criteria includes defining a threshold of encounters or events with an object or item in the sub-area, as in block 166. When the sub-area is determined to be not safe, the method can redefine the safe area to exclude the sub-area, as in block 170, and as shown in FIG. 5 as a new reduced VR safe area or new reduced VR space 320. Alternatively, the method can mark or designate the sub-area within the safe area as unsafe.

When an encounter or event in the safe area is not detected, the method proceeds to block 172. The method further includes detecting (at block 172) an object in the safe area which is a potential collision risk for a user, as in block 174. A virtual object is moved in response to the detecting of the object to avoid the potential collision risk, wherein the virtual object is part of the virtual reality environment, as in block 178. When the method does not detect an object in the safe area with a potential for collision, the method ends.

With reference to the embodiments of the present disclosure, the method and system can use the information provided by the usage of the user to modify a user's safe bounds, such as moving beyond a safe area, or a potential collision or collision within a safe area as discussed above. Such information can be used to recommend locations to place or position items within a virtual environment.

Additionally, an encounter or event can firstly include detecting when a user goes outside of a safe area. The system continues to monitor the usage of the user. If the user successfully interacts with one or more items outside of the safe area, the method and system can log the area outside of the safe area as potentially safe. The system can continue to monitor behavior of the user including interaction in the area outside the safe space, and continue to add events designated to this area, for example, maintaining a database. Once an area outside of the safe space meets or exceeds a predefined threshold, the system can designate or mark the area as safe or as part of the safe area. In one example, each event in a second area outside the safe area can be weighted or assigned a weight, and over a period of time, a threshold weight can be attained which will initiate the area as being designated as safe.

The system can assess and mark or designate each event as successful or unsuccessful relating to whether a collision was detected. The system can also designate a type of interaction that occurs. For example, a type of action can include, walking into an area, or interacted with an area using hands or arms. For instance, when a user walks into an area, the area can be marked as safe. When a user interacts with an area using only their hands or arms, the area can be marked as safe to place objects, but not for a user to move into, for instance, walk into. Additionally, a type of VR device (such as a headset or a hand controller) can determining when the bounds should be displayed to warn the user.

Additionally, an encounter or event can secondly include detecting when a user collides with something inside a safe area. The detection can include tracking accelerometer data when inside a space marked as safe or safe area. For example, when an event occurs such as a collision within the safe area, a first analysis can include determining if a sudden movement was expected if a user was interacting in the VR environment such as playing a game which initiated a sudden movement by the user. Occurrences of events can be logged, including expected events (in reaction to the VR interaction) and unexpected events (not in response to the VR interaction). The events can be given a weight or numerical value. Over a period of time, the system can determining if multiple events meet or exceed a threshold value. Over time, events can be associated to actions and a detailed map can be created of the user's VR environment. The map can mark areas that were originally considered safe, with a warning or as unsafe. For example, a low hanging lampshade can result in an area being marked as safe for some interactions, such as hand or arm movements, but not walking. Other areas which may be designated as unsafe can be marked as safe for some interaction, such as hand or arm motions similarly, for example, safe for arm or hand motions but not for walking, for instance, a couch could result in such a designation.

As discussed previously, the method and system of the present disclosure can divide the physical environment of the user into three dimensional (3D) cubes, in one example the cube size can be configured when setting up the system. In one example, each cube is given a rating between 0.0 (unsafe) and 1.0 (safe). Detected events in the space can be associated to the 3D cube in which they occurred, and after a period of time an environment map is updated and incorporated into VR experiences to refine the VR environment. For example, the system can show different warnings when the user gets close to moving outside the safe space, but could also include dynamically moving objects in the VR environment as the user moves. For example, when the user changes location in a VR game, a computer controlled VR item can be in an area considered unsafe, and in response, the system moves the item to a better location in the VR environment so the user can interact with it in a corresponding safe area (which corresponds to a geographical area safe for VR interaction for the user).

Figure 7:
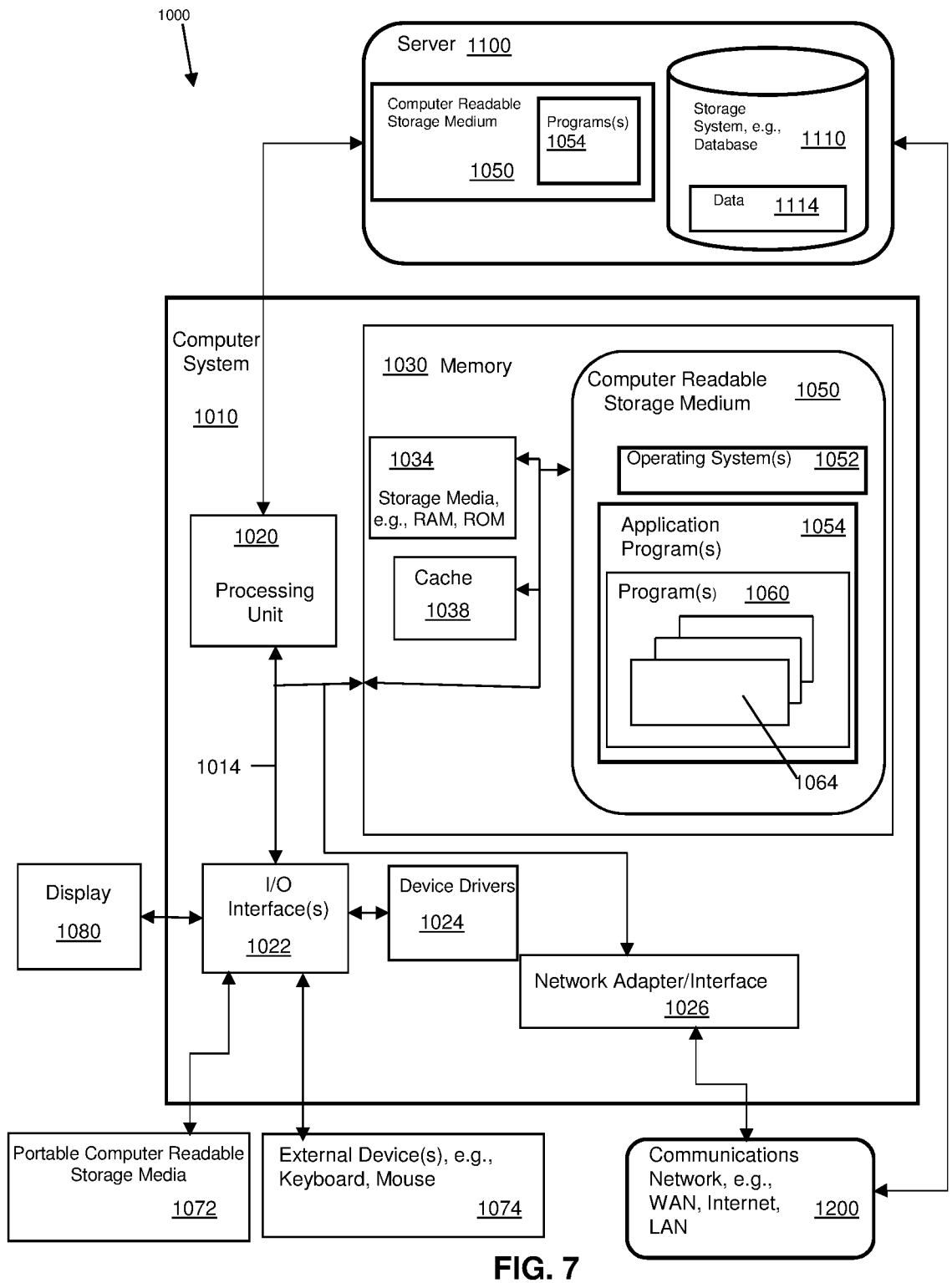
FIG. 7 is a schematic block diagram depicting a computer system according to an embodiment of the disclosure which may be incorporated, all or in part, in one or more computers shown in FIG. 1, and cooperates with the system and methods shown in FIGS. 1, 2, 3, 4, 5 and 6.

The computer system in the system 10 and discussed herein, such as VR system computer 22, or a remote server can include all or part of a computer system 1000 and computer 1010 shown in FIG. 7, which discloses a generic computer system 1000 and computer 1010. It is understood that the above disclosed computers/computer systems and the computer 1010 are representative or illustrative of many alternative computer devices and are presented here as generic representations for the purposes of the embodiments of the present invention. In the embodiment discussed above, for illustrative purposes, the method of the present disclosure can be embodied in a computer program 1060 (FIG. 7) or a software application stored on the computer 1010. The computer 1010 can all or in part represent the server 60. The server 60, in FIG. 1, is shown as a remote server to the VR system 20 and which can embody a program incorporating the method of the present disclosure, however, in other embodiment in accordance with the present disclosure, a computer program embodying the present method can be part of a computer system running locally in one or more of the illustrated components of the system 10 shown in FIG. 1 (as was discussed hereinabove). Further, a computer program embodying the present method can be cloud based or part of a cloud environment. In one embodiment such a cloud based system or environment can include all or part of the computer system 1000 (FIG. 7) and cloud based environment components shown in FIGS. 8 and 9. Alternative embodiments can include a computer program stored remotely (for example, on a remote server 1100 (FIG. 7)), and, for example, can be implemented as a service.

Referring to FIG. 7, a system or computer environment 1000 includes a computer system 1010 shown in the form of a generic computing device. The method 100, for example, may be embodied in a program 1060 embodied on a computer readable storage device, for example, generally referred to as memory 1030 and more specifically, computer readable storage medium 1050. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 7 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 7, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile or non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 100 (FIG. 2) (and methods shown in FIGS. 3 and 6), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer

1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
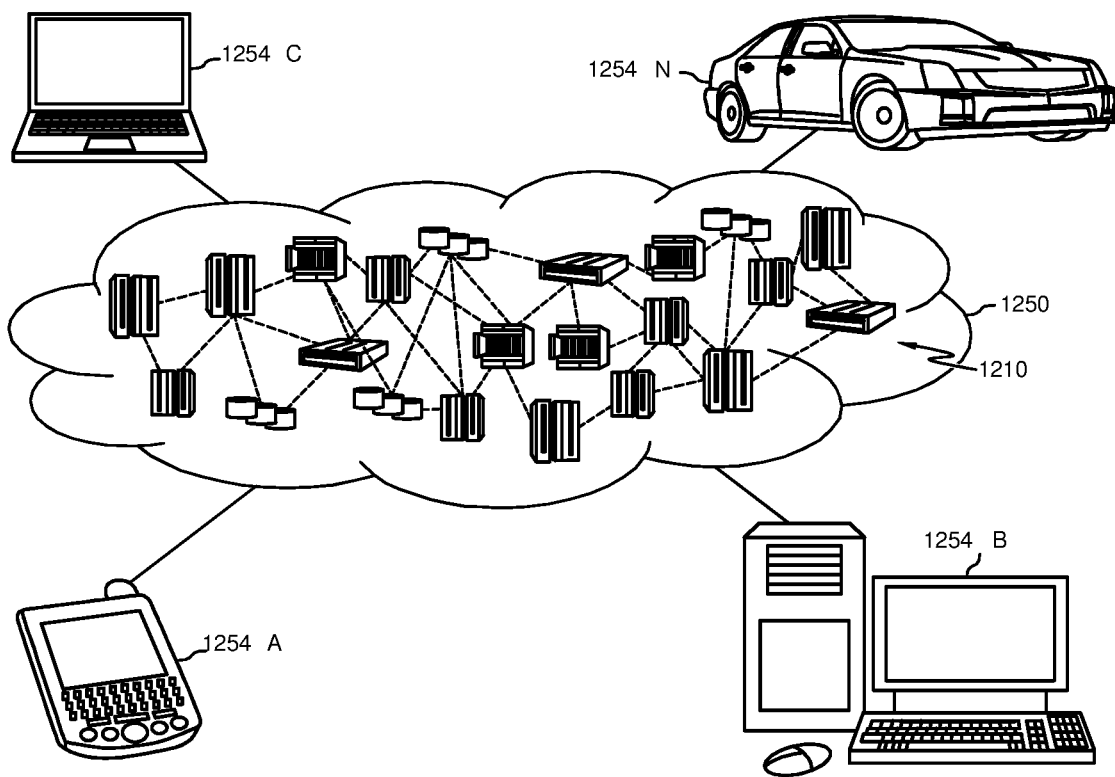
FIG. 8 is a functional block diagram depicting a cloud computing environment according to an embodiment of the present invention.

Referring now to FIG. 8, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 8 are intended to be illustrative only and that computing nodes 1210 and cloud computing environment 1250 can communicate with any type of computerized device over any type of network and/or network addressable connection (e.g., using a web browser).

Figure 9:
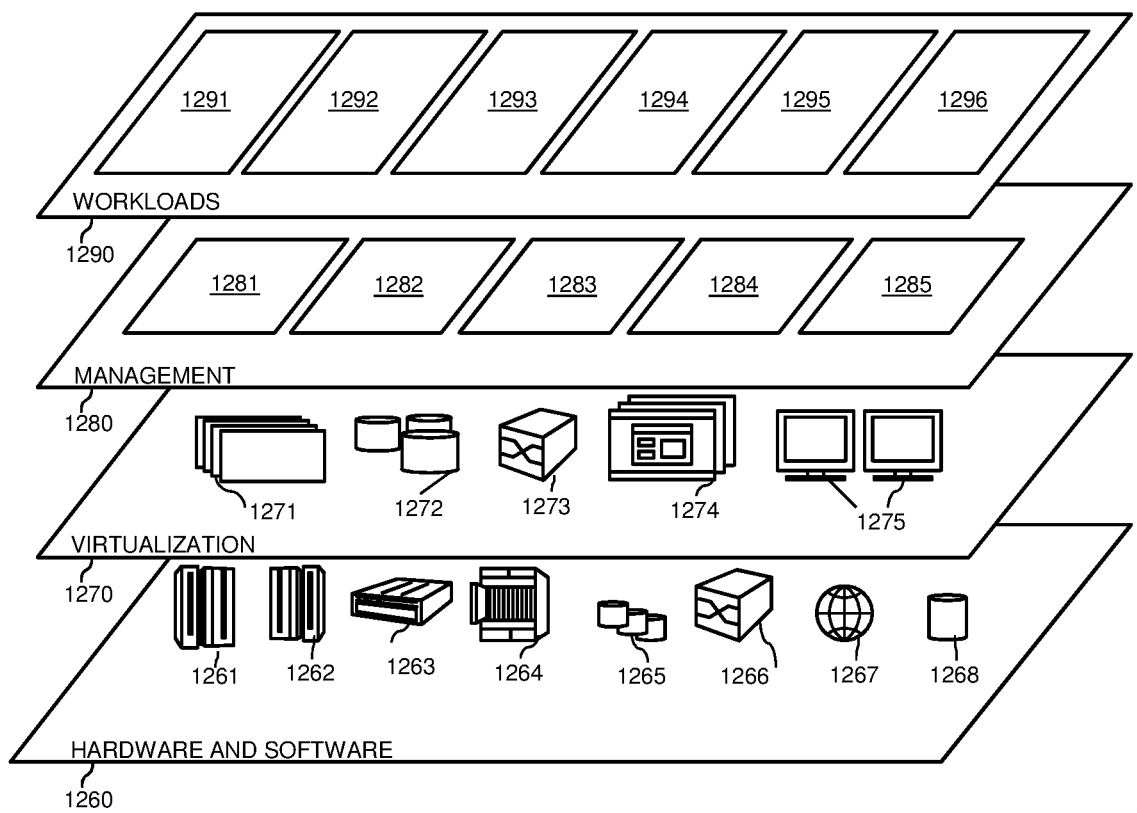
FIG. 9 is a diagram depicting abstraction model layers according to an embodiment of the present invention.

Referring now to FIG. 9, a set of functional abstraction layers provided by cloud computing environment 1250 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and modifying virtual reality boundaries based on usage 1296.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for modifying virtual reality (VR) boundaries based on usage, comprising:
    defining, using a virtual reality system including a computer communicating with a headset, a safe area which defines a geographic location complementary to a virtual reality environment for virtual reality interaction for a user;
    monitoring the safe area for when the user strays into a second area beyond the safe area;
    defining the second area in relation to the safe area that the user strayed into beyond the safe area;
    assessing the user interaction in the second area beyond the safe area for safety;
    determining when the second area is safe based on a criteria;
    determining when an event occurs with a physical object in the second area as part of the criteria, wherein the event includes a collision of the user;
    weighting the event, which includes the collision of the user, along with one or more additional events which occur in the second area, and over a period of time, a threshold weight being attained which initiates the second area as being designated as safe, wherein the event and the one or more additional events as multiple events meet or exceed the threshold weight;
    setting a threshold for a number of collisions including the user to initiate designating an area as safe or unsafe;
    designating the second area as safe when the threshold number of collisions are not detected; and
    in response to the second area being designated as safe, not initiating an alert to the user of being outside the safe area and in the second area.

2. The method of claim 1, redefining the safe area based on the determining when the second area is safe, and based on determining when a sub-area within the safe area is not safe, the redefining of the safe area including adjusting boundaries defining the safe area.

3. The method of claim 2, wherein the redefining includes:
    expanding the safe area to include the second area and/or decreasing the safe area by excluding the subarea.

4. The method of claim 2, wherein redefining the safe area includes reconfiguring the safe area by expanding the safe area to include the second area and/or decreasing the safe area by excluding the subarea; and
    creating a new safe area based on the redefining of the safe area, wherein the new safe area has second dimensions of a physical area different from first dimensions of a physical area defining the safe area.

5. The method of claim 1, wherein the criteria includes:
setting a threshold of incursions into the second area without a collision;
detecting a number of incursions into the second area without the collision for the user; and the method further including:
in response to reaching the threshold number of incursions into the second area without a collision for the user, determining that the second area is safe based on the criteria.

6. The method of claim 5, further comprising:
in response to the second area being determined to be safe, incorporating the second area as part of the safe area.

7. The method of claim 1, further comprising:
detecting an encounter with a physical object within the safe area, the encounter including a potential collision with the physical object;
defining a sub-area of the safe area based on the encounter with the physical object;
assessing the user interaction in the sub-area for safety based on a second criteria;
determining when the sub-area is not safe; and
in response to the determining when the sub-area is not safe, initiating an alert to the user when the user enters the sub-area.

8. The method of claim 7, wherein the second criteria includes:
setting a threshold of incursions into the sub-area with a collision;
detecting a number of incursions into the sub-area with the collision for the user;
and the method further including:
in response to reaching the threshold number of incursions into the sub-area with the collision for the user, determining that the sub-area is not safe based on the criteria.

9. The method of claim 8, further comprising:
in response to the sub-area being determined to be not safe, designating the sub-area as not part of the safe area and excluding the subarea from the safe area.

10. The method of claim 1, further comprising:
detecting an object in the safe area, the object being a potential collision risk for the user;
moving a virtual object in response to the detecting of the object to avoid the potential collision risk, the virtual object being part of the virtual reality environment.

11. A system for modifying virtual reality (VR) boundaries based on usage, the system comprising:
a computer system comprising: a computer processor, a computer-readable storage medium, and program instructions stored on the computer-readable storage medium being executable by the processor, to cause the computer system to perform a method, comprising:
defining, using a virtual reality system including a computer communicating with a headset, a safe area which defines a geographic location complementary to a virtual reality environment for virtual reality interaction for a user;
monitoring the safe area for when the user strays into a second area beyond the safe area;
defining the second area in relation to the safe area that the user strayed into beyond the safe area;
assessing the user interaction in the second area beyond the safe area for safety;
determining when the second area is safe based on a criteria;
determining when an event occurs with a physical object in the second area as part of the criteria, wherein the event includes a collision of the user;
weighting the events, which includes the collision of the user, along with one or more additional events which occur in the second area, and over a period of time, a threshold weight being attained which initiates the second area as being designated as safe, wherein the event and the one or more additional events as multiple events meet or exceed the threshold weight;
setting a threshold for a number of collisions including the user to initiate designating an area as safe or unsafe;
designating the second area as safe when the threshold number of collisions are not detected; and
in response to the second area being designated as safe, not initiating an alert to the user of being outside the safe area and in the second area.

12. The system of claim 11, redefining the safe area based on the determining when the second area is safe, and based on determining when a sub-area within the safe area is not safe, the redefining of the safe area including adjusting boundaries defining the safe area.

13. The system of claim 12, wherein the redefining includes:
expanding the safe area to include the second area and/or decreasing the safe area by excluding the subarea.

14. The system of claim 12, wherein redefining the safe area includes reconfiguring the safe area by expanding the safe area to include the second area and/or decreasing the safe area by excluding the subarea; and
creating a new safe area based on the redefining of the safe area, wherein the new safe area has second dimensions of a physical area different from first dimensions of a physical area defining the safe area.

15. The system of claim 11, wherein the criteria includes:
setting a threshold of incursions into the second area without a collision;
detecting a number of incursions into the second area without the collision for the user; and the method further including:
in response to reaching the threshold number of incursions into the second area without a collision for the user, determining that the second area is safe based on the criteria.

16. The system of claim 15, further comprising:
in response to the second area being determined to be safe, incorporating the second area as part of the safe area.

17. The system of claim 11, further comprising:
detecting an encounter with a physical object within the safe area, the encounter including a potential collision with the physical object;
defining a sub-area of the safe area based on the encounter with the physical object;
assessing the user interaction in the sub-area for safety based on a second criteria;
determining when the sub-area is not safe; and
in response to the determining when the sub-area is not safe, initiating an alert to the user when the user enters the sub-area.

18. The system of claim 17, wherein the second criteria includes:
setting a threshold of incursions into the sub-area with a collision;

detecting a number of incursions into the sub-area with the collision for the user;

and the method further including:

in response to reaching the threshold number of incursions into the sub-area with the collision for the user, determining that the sub-area is not safe based on the criteria.

19. A computer program product for modifying virtual reality (VR) boundaries based on usage, the computer program product comprising a computer readable storage medium having program instructions embodied therewith, the program instructions executable by a computer to cause the computer to perform a method, comprising:

defining, using a virtual reality system including a computer communicating with a headset, a safe area which defines a geographic location complementary to a virtual reality environment for virtual reality interaction for a user;

monitoring the safe area for when the user strays into a second area beyond the safe area;

defining the second area in relation to the safe area that the user strayed into beyond the safe area;

assessing the user interaction in the second area beyond the safe area for safety;

determining when the second area is safe based on a criteria;

determining when an event occurs with a physical object in the second area as part of the criteria, wherein the event includes a collision of the user;

weighting the event, which includes the collision of the user, along with one or more additional events which occur in the second area, and over a period of time, a threshold weight being attained which initiates the second area as being designated as safe, wherein the event and the one or more additional events as multiple events meet or exceed the threshold weight;

setting a threshold for a number of collisions including the user to initiate designating an area as safe or unsafe;

designating the second area as safe when the threshold number of collisions are not detected; and in response to the second area being designated as safe, not initiating an alert to the user of being outside the safe area and in the second area.

* * * * *